Dec. 27, 1966  P. R. FAIRBANKS  3,293,952

PIPE HOLE CUTTER AND METHOD

Filed July 30, 1963  4 Sheets-Sheet 2

INVENTOR.
Philip R. Fairbanks
BY
Bacon & Thomas
ATTORNEYS

United States Patent Office 3,293,952
Patented Dec. 27, 1966

3,293,952
PIPE HOLE CUTTER AND METHOD
Philip R. Fairbanks, 1219 10th Ave. S.,
Nampa, Idaho 83651
Filed July 30, 1963, Ser. No. 298,778
16 Claims. (Cl. 77—42)

This invention relates generally to an apparatus and method for cutting holes in the side wall of pipes or conduits, and more particularly to an improved device and method for cutting a circular hole in the side wall of a pipe, said device being constructed to retain therein the core of side wall material formed during the hole-cutting operation, and to prevent it from falling into the pipe.

It frequently is desirable to connect a branch pipe line to an existing sewer, water, or other pipe line, and the common practice is to first make a hole in the side wall of the existing pipe and to then secure a stub fitting within said hole. The branch line is then connected to the stub fitting.

Commonly, sewer and other buried pipe lines are constructed of concrete, or a like material. In the past, holes have been manually cut in such concrete pipes, by the use of a hammer and chisel. While the hole can be made in this manner, the outline thereof is normally quite irregular, and the dimensions thereof will not be held within close tolerances. Further, the material removed from the pipe side wall in the formation of the hole often falls into the pipe and may result in blockage, or in damage to equipment positioned downstream.

After the hole has been made in the side wall of the pipe, a stub fitting is inserted thereinto, as above stated. Because the periphery of the hole is usually jagged, and because there is normally a fairly wide clearance between the stub and the wall defining the hole, it is common practice to secure the stub in position with a mortar mixture of Portland cement, sand and water. While a suitable joint connection can be obtained thereby, this method is costly and time-consuming because of the slow-setting of the joint. As a result, the trench which is normally dug to provide access to the buried pipe must remain open for a considerable period of time to permit the joint to set, and hence offers a continuing safety hazard.

The apparatus of the present invention is constructed to be fixedly secured to a pipe in a predetermined position and to cut a circular hole through the pipe side wall within very close tolerances. Thus, a stub fitting may be inserted into a hole made with the apparatus of the present invention, and only a very small clearance will be present between the wall of the hole and the exterior of the side wall of the stub. Because of this small clearance, the usual mortar mixture is not necessary to complete the joint; instead, a suitable epoxy resin adhesive paste can be utilized to secure the stub in position. Epoxy resin pastes are waterproof, normally dry within a very short period of time, and hence the period during which the access trench must remain open is relatively short when a branch connection is made according to the present invention.

The present pipe hole cutter includes a housing within which is rotatably received a cylindrical cutter sleeve. The cutter sleeve has carbide tipped teeth on the lower end thereof, and is rotated by a suitable air-driven or other motor. Such cutter will make an opening through the side wall of a concrete pipe within a very short period of time, the wall defining said opening being relatively smooth and unbroken.

The present pipe hole cutter also embodies means for recovering the side wall core resulting from the annular recess made by the cutter sleeve during the hole-cutting operation. For this purpose, a piece of magnetic-responsive material is first adhesively secured to the exterior of the pipe at the center of the hole to be cut, prior to the beginning of the cutting operation. The cylindrical cutter sleeve has axially mounted therein a floating magnet, which functions during the cutting operation to attract and hold the piece of magnetic-responsive material. As the cutter sleeve completes its travel through the pipe side wall, the core is retained in the cutter sleeve by the magnet. Thus, the side wall core is prevented from falling into the pipe, and is easily recovered from the cutter sleeve after the device has been removed from the pipe.

The present hole cutting device also includes a supporting frame having pipe-engaging clamping arms and a unique roller assembly on said arms, which function to keep the device in longitudinally fixed position on the pipe, and to prevent rotation of said device. The roller assembly includes a roller secured to the lower end of each of the pipe-engaging clamping arms, and a pawl-type brake associated with each roller to prevent rotation thereof in one direction.

It is an object of this invention to provide a hole cutter for use with concrete pipe and the like, constructed to quickly cut a precisely shaped hole through the side wall of said pipe, and to recover the core cut out of said side wall.

Another object is to provide a hole cutter that can be easily attached to a pipe, and which will remain in fixed position thereon during the cutting operation.

A further object is to provide a power driven hole cutter that is compatible with different types of motors.

A still further object is to provide a pipe hole cutter having means to conduct fluid to the cutter assembly, for cooling the cutter and to wash away the cuttings.

Still another object is to provide a method of cutting a hole in concrete pipe and the like, whereby the cut-out material is prevented from falling into the pipe.

Other objects and many of the attendant advantages of the present invention will become apparent from the following detailed description and the accompanying drawings, wherein.

Referring now to the drawings, the pipe hole cutter is indicated generally at 2, and is shown secured in position about a pipe 4. The pipe 4 may be made of concrete, or some other material, and may be a portion of a buried water line, sewer line or the like, or a pipe section in which a stub fitting is to be mounted prior to use, either above or below ground.

The pipe hole cutter 2 includes a cylindrical housing 6, having a collar 8 of increased diameter on the lower end thereof. The lower edge 10 of the housing 6 is contoured to conform to the cylindrical configuration of the pipe 4 with which the cutter 2 is to be utilized; the lower edge 10 will obviously have a different configuration for pipes 4 of different diameters. The housing 6 includes a pair of diametrically opposed vertical notches 12 (FIGS. 3 and 8) in the lower end thereof, said notches being aligned along a diametrical line extending transversely to the longitudinal axis of the pipe 4.

A pair of supporting brackets 14 and 16 is secured to the collar 8 of the housing 6 near the lower edge 10 thereof, the brackets 14 and 16 being disposed at diametrically opposite sides of the housing 6, and perpendicular to a diametrical line extending parallel with the longitudinal axis of the pipe 4. The bracket 14 includes a centrally positioned spacer bar 18 (FIG. 4), which is welded directly to the collar 8, and an outer, longer arcuate bar 20, which is welded centrally thereof to the spacer bar 18. Two short, arcuate bars 22 are welded to the collar 8 adjacent the opposite ends of the spacer bar 18, and have a configuration corresponding to the end portions of the bar 20. The supporting bracket 16 is constructed in a manner identical to the supporting bracket 14.

A pair of arcuate clamping arms 24 and 26 is pivotally attached to the opposite ends of the bracket 14, and a similar pair of arcuate clamping arms 28 and 30 is pivotally attached to the opposite ends of the supporting bracket 16. The clamping arms 24, 26, 28 and 30 are identical in construction, and hence only the clamping arm 28 will be described in detail.

Figures 1, 2, 4:
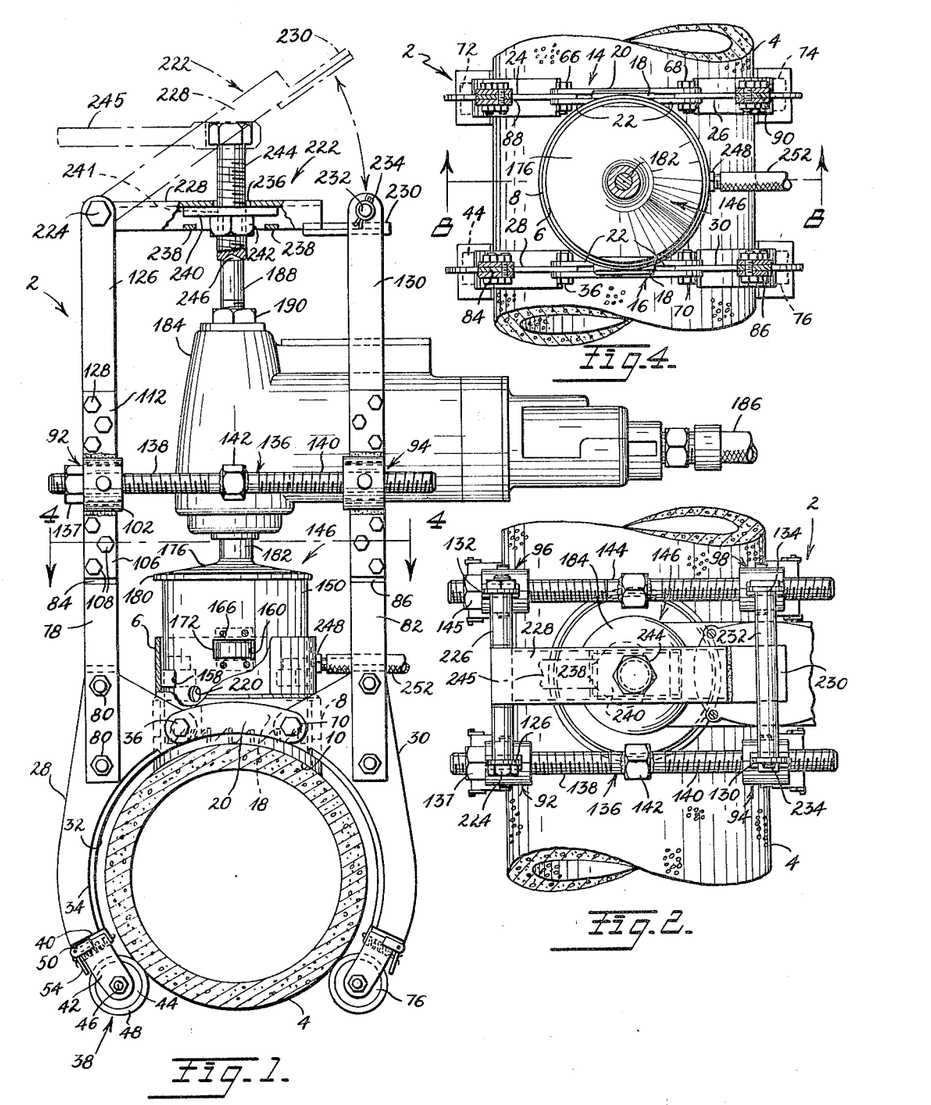
FIG. 1 is a front, fragmentary, elevational view of the concrete pipe hole cutter of the present invention, illustrated in conjunction with an air motor for rotating the cutter assembly.
FIG. 2 is a plan view of the pipe hole cutter of FIG. 1.
FIG. 4 is a horizontal sectional view, taken along the line 4—4 of FIG. 1.
Figures 3, 5, 6, 7:
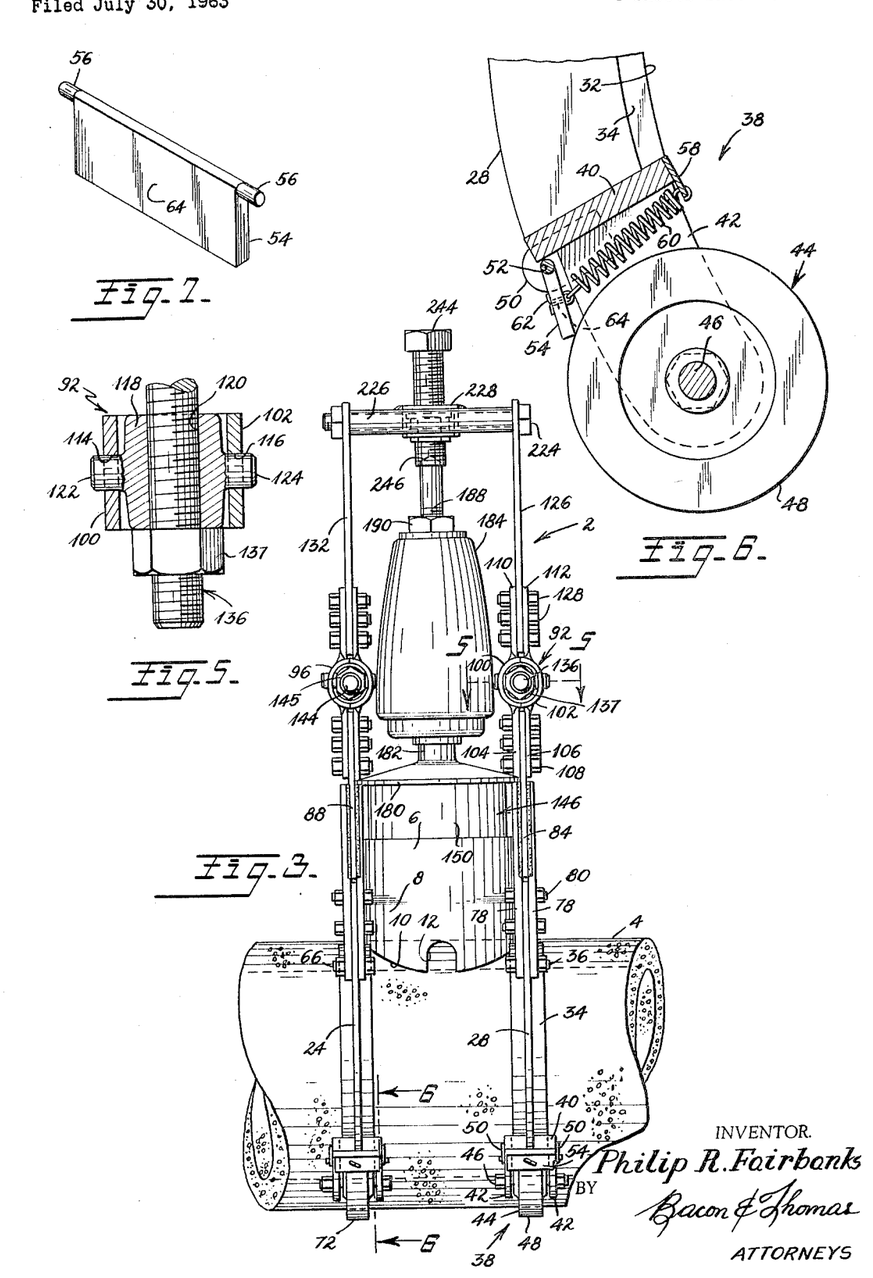
FIG. 3 is a side elevational view of the pipe hole cutter of FIG. 1, viewed from the left.
FIG. 5 is an enlarged, fragmentary, horizontal sectional view taken along the line 5—5 of FIG. 3, showing the construction for one of the swivel nuts.
FIG. 6 is an enlarged, fragmentary, vertical sectional view, taken along the line 6—6 of FIG. 3, showing one of the roller and pawl brake assemblies.
FIG. 7 is a perspective view of one of the brake plates associated with the roller assembly of FIG. 6.

Referring to FIGS. 1, 3 and 6, the clamping arm 28 has an arcuate inner periphery 32, to which is secured an axially extending, arcuate reinforcing web 34. The upper end of the arcuate arm 28 has a bore therethrough, and is received within one end of the supporting bracket 16, where it is pivotally secured by a bolt 36. Secured to the lower end of the arm 28 is a roller assembly 38.

The lower end of the clamping arm 28 has a flat plate 40 secured thereto, said plate lying in a plane extending generally radially from the center of the pipe 4, as shown in FIG. 1. The plate 40 is wider than the web 34 and has a pair of downwardly extending, arcuate arms 42 secured thereto. A roller 44 is rotatably mounted between the arms 42 on an axial bolt 46, said roller including a rim 48 made of rubber or other suitable resilient material. As is best shown in FIG. 6, the roller-supporting arms 42 are sufficiently long to provide a substantial clearance between the plate 40 and the rim 48 of the roller 44.

The plate 40 has a pair of outwardly extending ears 50, FIGS. 3 and 6, secured to the opposite ends thereof, which ears have aligned bores 52 therethrough for receiving a brake plate 54. Referring to FIG. 7, the brake plate 54 is generally rectangular in configuration, and has a pair of stub shafts 56 extending longitudinally from the top edge thereof. The stub shafts 56 are received within the bores 52, and function to pivotally suspend the brake plate 54 above the roller rim 48. The brake plate 54, as is best shown in FIG. 6, has a width sufficient to engage the rim 48, and to act as a pawl to prevent rotation of the roller 44 in a clockwise direction.

The plate 40 has a downwardly projecting tab 58 secured centrally thereof at the lower end of the reinforcing web 34, said tab having one end of a spring 60 secured thereto. The other end of the spring 60 is connected to the eye of a cotter pin 62. The legs of the cotter pin 62 extend through a bore 64 disposed centrally in the brake plate 54 and are bent in opposite directions to secure the spring 60 to the brake plate 54. The spring 60 is mounted in a tensioned state, and hence functions to continually urge the brake plate 54 toward the rim 48 of the roller 44.

The arcuate clamping arms 24, 26 and 30, as has been stated, are identical to the clamping arm 28, and are secured to their associated brackets by bolts 66, 68 and 70, respectively. Each of the clamping arms 24, 26 and 30 has a roller 72, 74 and 76, respectively, mounted on the lower end thereof, a pawl brake assembly being associated with each of said rollers. Thus, when the four clamping arms are engaged about the periphery of the pipe 4, as shown in FIG. 1, the pawl brake assemblies associated with the rollers 44, 72, 74 and 76 will prevent rotation of said clamping arms in either direction about the longitudinal axis of said pipe.

The clamping arm 28 is widened and is generally triangular at its upper end and has a pair of lower lever arms 78 secured thereto by bolts 80, said lever arms being arranged to project vertically upwardly when the clamping arm 28 is disposed in a clamping position about the pipe 4. When the clamping arm 28 is disposed in said clamping postion, the center line of the lever arms 78 will extend generally tangentially to the outer periphery of the pipe 4. The clamping arm 30 is also widened at its upper end and provided with a pair of lower lever arms 82, which are identical to the lever arms 78, and the clamping arms 24 and 26 are likewise widened and provided with similar lower lever arms.

A mounting bar 84 is welded between the lever arms 78, and projects upwardly therefrom (FIG. 3). A similar bar 86 is welded to the lever arms 82, and like bars 88 and 90 project upwardly from the clamping arms 24 and 26, respectively (FIG. 4). Mounted on the bars 84, 86, 88 and 90 are swivel brackets 92, 94, 96 and 98, respectively. The swivel brackets are all identical, and hence only the bracket 92 will be described in detail.

Referring to FIGS. 1, 3 and 5, the swivel bracket 92 includes a pair of opposed, semi-cylindrical collar sections 100 and 102, said collar sections having downwardly directed bars 104 and 106, respectively, welded thereto. The bars 104 and 106 engage the opposite sides of the upwardly projecting bar 84, and are secured thereto by bolts 108. A pair of upwardly projecting bars 110 and 112 is welded to the collar sections 100 and 102, respectively, and extend vertically upwardly therefrom in alignment with the bars 104 and 106.

As is best shown in FIG. 5, the opposed collar sections 100 and 102 have diametrically opposed, aligned bores 114 and 116 therein. Received within the collar sections 100 and 102 is a swivel nut 118 having a threaded bore 120 extending therethrough, and having a pair of oppositely projecting cylindrical trunnions 122 and 124 thereon. The trunnions 122 and 124 are received within the bores 114 and 116, respectively, and function to pivotally mount the nut 118 within the swivel bracket 92. The lower end of an upwardly extending lever arm 126 is secured between the upwardly projecting bars 110 and 112 by bolts 128.

The swivel brackets 94, 96 and 98, as has been stated, are identical in construction to the swivel bracket 92, and have vertically projecting upper lever arms 130, 132 and 134, respectively, secured thereto. A turnbuckle rod 136, FIGS. 1 and 2, connects the opposed swivel brackets 92 and 94, and has a right-hand thread 138 on the left end thereof and a left hand thread 140 on the right end thereof.

The threaded ends of the turnbuckle rod 136 are received within the swivel nuts 118 mounted within the opposed swivel brackets 92 and 94. The turnbuckle rod 136 is provided centrally thereof with a hexagonal-shaped portion 142 engageable by a wrench to facilitate turning thereof. An identical turnbuckle rod 144 is connected to extend between the swivel nuts of brackets 96 and 98.

The two turnbuckle rods 136 and 144 are operable to cause their associated swivel brackets to move toward or away from each other, depending upon the direction in which said bars are rotated. Movement of the swivel brackets causes their associated arcuate clamping arms 24, 26, 28 and 30 to pivot about their respective attaching bolts 36, 66, 68 and 70 to move the rollers 44, 72, 74 and 76 toward or away from the pipe 4.

Prior to mounting the cutter apparatus 2 on a pipe pipe 4, the turnbuckles 136 and 144 are manipulated in one direction to open the clamping arms 28 and 30 and the clamping arms 24 and 26, respectively to receive the pipe 4. The housing 6 is then rested on the cylindrical surface of the pipe 4, with the four clamping arms disposed about the sides of the pipe. The turnbuckle rods 136 and 144 are then manipulated in the opposite direction, and their associated clamping arms are thus caused to embrace and tightly engage the rollers 44, 72, 74 and 76 with the outer cylindrical surface of the pipe 4; the pawl brake plates 54 associated with said rollers then function to prevent rotation of the cutter assembly about the longitudinal axis of said pipe.

After the turnbuckle rods 136 and 144 have been adjusted, lock nuts 137 and 145, respectively, on one end thereof are tightened against the swivel nuts 118. These lock nuts hold the clamping arms 24, 26, 28 and 30 in place and insure that the pipe cutter 2 will remain securely in position.

Figures 8, 9, 10, 11:
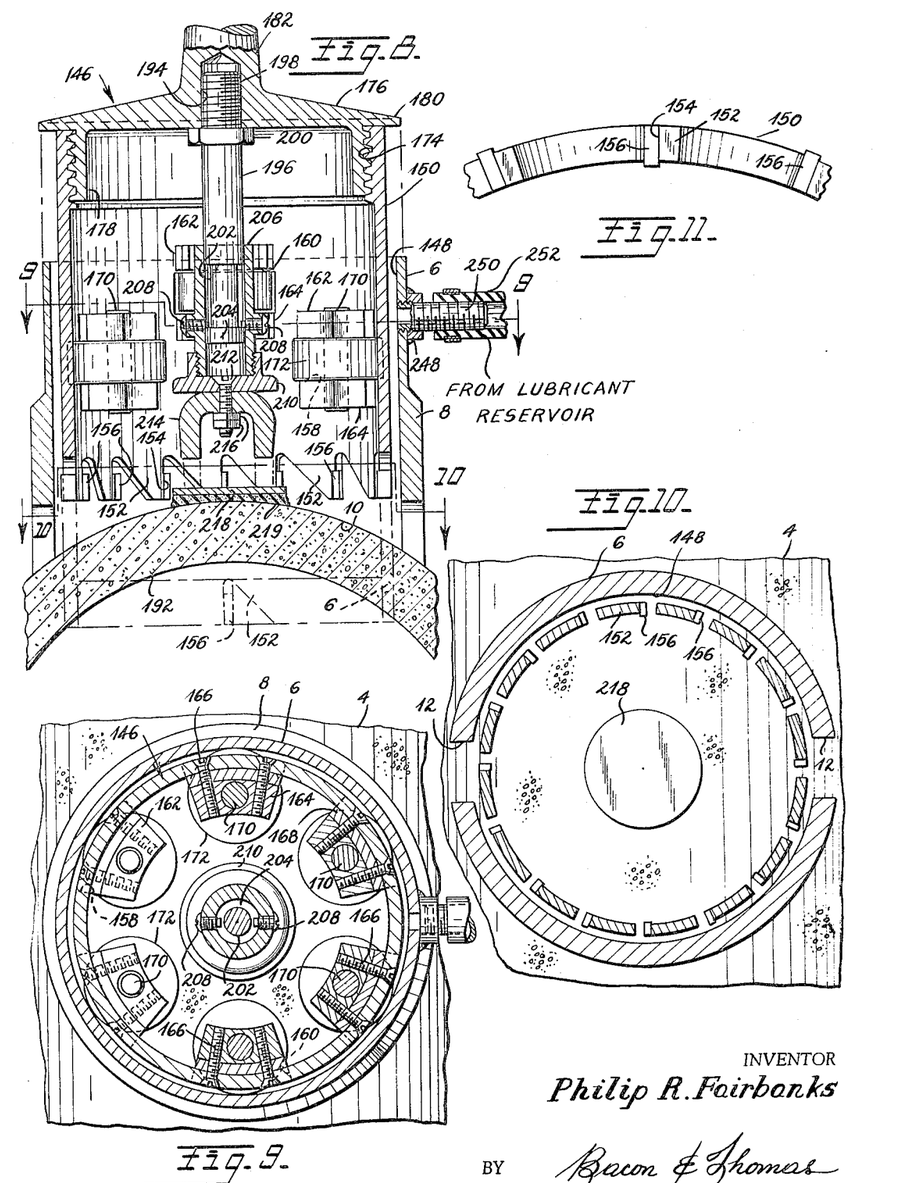
FIG. 8 is an enlarged, vertical sectional view, taken along the line 8—8 of FIG. 4, showing the construction of the cutter assembly.
FIG. 9 is a horizontal, sectional view, taken along the line 9—9 of FIG. 8, showing in particular the manner in which the friction rollers are mounted.
FIG. 10 is a horizontal, sectional view taken along the line 10—10 of FIG. 8.
FIG. 11 is an enlarged, fragmentary, bottom plan view of the cutting bits shown in FIG. 8.

The cutter assembly is indicated generally at 146, and as is best shown in FIGS. 1, 8 and 9, is disposed in the housing 6. The housing 6 has a cylindrical bore 148 extending therethrough, within which is received a cylindrical cutter sleeve 150, said sleeve having a diameter substantially smaller than that of the bore 148. The cylindrical cutter sleeve 150 has a series of teeth 152 formed on the lower end thereof, said teeth each having the configuration of a truncated right triangle; thus, the front faces 154 of the teeth 152 extend parallel to the longitudinal axis of the cutter sleeve 150. The number of teeth 152 can be varied, but typically will be about sixteen.

The vertical front face 154 of each of the teeth 152 has a rectangular tool bit 156 fused thereto. The tool bits 156 are made of tungsten carbide steel, or other suitable hard material capable of cutting through the pipe 4. When the cutter apparatus 2 is to be utilized with concrete pipe reinforced with steel, the teeth 152 are preferably provided with diamond-tipped tool bits.

The lower faces of the tool bits 156 are positioned to lie flush with the bottom face of their associated teeth 152, and have a width somewhat greater than the radial wall thickness of the cutter sleeve 150 in the region of the teeth 152. As is best shown in FIG. 11, the tool bits 156 are positioned radially with alternate ones projecting in opposite directions on the inner and outer sides of the cutter sleeve 150, whereby when the cutter sleeve is rotated, an annular groove will be cut having a width slightly greater than the radial thickness of the wall of said cutter sleeve. In any event, the diameter of the hole, as determined by the groove, will be only slightly larger than the outside diameter of the stub pipe to be mounted therein.

Referring to FIGS. 8 and 9, the cylindrical wall of the cutter sleeve 150 is provided with a first set of three circumferentially spaced, rectangular openings 158 disposed a short distance above the teeth 152. A second set of three rectangular openings 160 is positioned above the first set of rectangular openings 158, the openings 160 being interdigitated between the openings 158. An upper bracket 162 and a lower bracket 164 are secured to the cutter sleeve 150 above and below, respectively, each of the openings 158 and 160, said brackets being secured in position by screws 166, which pass through countersunk holes in the wall of said cutter sleeve. Shims 168 are positioned between the upper and lower brackets 162 and 164 and the wall of the sleeve 150, and function to provide proper positioning of said brackets.

A vertical shaft 170 extends between each pair of brackets 162 and 164, and supports a roller 172 thereon. The rollers 172 project through their associated openings 158 and 160, and, as is best shown in FIGS. 1 and 9, are positioned to engage the inner surface of the wall of the cylindrical bore 148 within the housing 6. Thus, the circumferentially spaced, axially-staggered rollers 172 function to rotatably support the cutter sleeve 150 concentrically within the bore 148, the staggered relationship of said rollers preventing the cutter sleeve 150 from tilting out of concentricity within the housing 6.

The upper end of the cutter sleeve 150 has an increased wall thickness, and is provided with internal threads 174. A spindle head 176 is secured within the threaded opening 174 in the cutter sleeve 150 and includes a downwardly extending, cylindrical flange 178 having threads thereon of a size to mate with the threads 174. The spindle head 176 also includes a circular flange 180 having an outer diameter about equal to the external diameter of the upper portion of the housing 6, and which functions to limit the extent to which the cutter sleeve 150 can be telescoped within said housing.

A centrally positioned, axially extending, mandrel 182 is formed integrally with the spindle head 176, and extends upwardly therefrom. The mandrel 182 is secured within the chuck of a suitable air-driven motor 184 (FIGS. 1 and 3), which is supplied with compressed air through a conduit 186. Conventionally, air motors 184 of the type utilized for a purpose such as this, are provided with a chuck constructed to receive a mandrel having a suitable Morse taper thereon. The motor 184 is urged toward the mandrel 182, through a stud 188 mounted on said motor and secured thereto by a lock nut 190, as will be explained more fully hereinafter.

The motor 184 preferably will rotate the mandrel 182 and hence the cutter sleeve 150, at a speed of about 125 revolutions per minute. While an air-driven motor is usually utilized for work in an open trench, it is to be understood that the invention is in no sense limited thereto. Other power driving devices can be used equally well, such as an electric motor with suitable gear reduction apparatus, or a hydraulic motor. It is to be understood that the mandrel 182 will be suitably shaped for reception within the chuck of the motor with which the pipe cutter apparatus 2 is intended for use.

With the pipe hole cutter apparatus 2 assembled on a pipe 4, rotation of the mandrel 182 will cause the tool bits 156 on the teeth 152 to cut or bite into the material of the side wall of the pipe 4. As rotation of the cutter sleeve 150 continues, an annular groove G, FIG. 13, will be cut into the side wall of the pipe 4. Because the cutter apparatus 2 is firmly fixed in position on the pipe 4, and because the cutting is done by hardened tool bits 156, the dimensions and configuration of the annular groove G are precisely controlled. When the annular groove G has been cut completely through the pipe 4, which occurs when the cutter sleeve 150 has moved to the position shown in phantom lines in FIG. 8, a side wall core 192 will have been formed.

In the past, the material removed from a pipe side wall during the making of a hole therethrough has usually been allowed to fall into the pipe. While some of the removed material might be recovered after the cutting operation, it usually has proved quite difficult to recover all of such material. In the present invention, however, means is provided to automatically recover the entire core 192, whereby substantially no removed wall material is allowed to fall into the pipe 4.

To this end, the spindle head 176 is provided with a threaded bore 194 disposed centrally thereof and opening downwardly toward the pipe 4 (FIG. 8). A spindle 196, having a threaded upper end 198, is secured in the threaded bore 194, and extends downwardly concentrically within the cutter sleeve 150. The spindle 196 includes a hexagonal portion 200 positioned immediately below the threaded upper end 198, which facilitates mounting the spindle in the threaded bore 194. The spindle 196 also includes a wide groove portion 202, adjacent to the lower end thereof, the groove 202 being terminated at its lower end by a flange 204.

A sleeve 206 is received on the lower end of the spindle 196, said sleeve having an inside diameter slightly larger than the outer diameter of said spindle, whereby it is free to slide vertically and to revolve thereon. The sleeve 206 has a pair of diametrically opposed bosses thereon containing threaded bores for the reception of stop screws 208. The inner ends of the stop screws 208 project into the groove 202, and function to secure the sleeve 206 on the spindle 196. Thus, the sleeve 206 is free to revolve on the spindle 196, and to move axially relative thereto to the extent permitted by the length of the groove 202.

The lower end of the sleeve 206 is externally threaded and has a cup-shaped adapter 210 secured thereto. The adapter 210 is made of a non-magnetic material, such as brass, and has a bolt 212 extending through the center thereof. A suitable horseshoe magnet 214 is secured to the adapter 210 by the bolt 212 and nuts 216. The spindle 196, the sleeve 206, and the groove 202 are preferably proportioned so that the magnet 214 will remain out of contact with the pipe 4 until the annular groove G being cut by the teeth 152 is nearly completed, but so that said magnet 214 will engage the outer surface of the pipe 4 prior to completion of said annular cut. The axial length of the groove 202 is sufficient to permit the cutter 150 to fully enter the housing 6 without causing the magnet 214 to exert inward force on the core 192, it being understood that after the magnet has contacted the pipe 4, the spindle 196 can slide downwardly through the sleeve 206 as the cutter continues to penetrate the pipe wall.

If the conduit or pipe 4 is constructed of a magnetic-responsive material, it is apparent that the core 192 will be attracted to the magnet 214. However, the cutter apparatus 2 of the present invention is primarily intended for use with non-magnetic pipe, such as concrete. Hence, the present invention makes special provision for the retrieval of a non-magnetic core by the magnet 214.

Referring again to FIG. 8, prior to assembly of the pipe hole cutter 2 on the pipe 4, a plate 218 of magnetic-responsive material is secured to the external surface of said pipe 4 centrally of the proposed hole. The plate 218 can be of steel, and is attached to the concrete pipe 4 by raw gum rubber 219 applied to one side thereof. In practice, the rubber 219 can be backed with a piece of cloth, if desired, in the manner of a conventional tire patch, until the plate is to be used, whereupon, the cloth backing will merely be removed and the gummed side of the steel plate 218 will then be firmly pressed against the surface of the pipe 4.

With the plate 218 in position, the core 192 will be attracted to and held by the magnet 214, and hence will be prevented from falling into the pipe 4 upon completion of the annular cut by the teeth 152. The core will be held in position during removal of the cutter apparatus 2 from the pipe 4, and thereafter can be removed from the cutter sleeve 150 by inserting a suitable prying tool through a circular opening 220 (FIG. 1) provided in the side wall of said cutter sleeve.

In order for the cutter assembly 146 to properly function, it is necessary that a downward pressure be exerted thereon during the cutting process. Hence, the cutter apparatus 2 is provided with hold-down means 222 (FIGS. 1–3), which holds the motor 184 in position, and which is operable to urge the cutter assembly 146 downwardly as the teeth 152 on the cutter sleeve 150 cut into the side wall of the pipe 4.

The upper end of each of the upper lever arms 126, 130, 132 and 134 is provided with a bore. A bolt 224 extends through the bores in the lever arms 126 and 132, which are aligned; and a tubular section 226 is supported upon said bolt 224 and extends between said lever arms. One end of a downwardly facing, U-shaped bracket 228 is welded centrally to the tubular section 226, the opposite end of said bracket 228 having a tongue 230 welded to the bottom thereof.

The tongue 230, as is best shown in FIG. 1, has a length sufficient to project beyond the opposed upper lever arms 130 and 134 when the apparatus 2 is in its assembled position about the pipe 4. A headed pin 232 is passed through the openings in the upper lever arms 130 and 134, which are aligned, and is secured in position by a cotter pin 234. When the apparatus 2 is in its operative position, the tongue 230 is engaged under the pin 232, whereby the hold-down means 222 is held in its closed position.

The U-shaped bracket 228 has a circular opening 236 in its base positioned concentrically about the longitudinal axis of the housing 6, and a pair of retaining bars 238 are welded to extend transversely between the legs thereof at the underside of said bracket at a point on either side of said opening. A rectangular retainer plate 240 is floatingly received within the bracket 228 above the retaining bars 238, and has a width slightly less than the distance between the downwardly projecting legs of said bracket. The plate 240 has a length at least as great as the distance between the outer edges of the retaining bars 238. A nut 242 is welded to the underside of the plate 240 centrally thereof in position to confront a hole 241 in said plate (FIG. 1). A bolt 244 passes through the bracket opening 236 and plate opening 241, and is received within the nut 242 from which it extends downwardly toward the motor 184. The bolt 244 has a diameter substantially smaller than that of the opening 236, and hence can move laterally and longitudinally relative to the bracket 228. This adjustment provides compensation for any vertical misalignment with the stud 188 on the air motor 184. The plate 240 is restrained against rotation by the downwardly projecting legs of the bracket 228, and hence the bolt 244 may be readily threaded upwardly and downwardly relative thereto. The plate 240 also retains the bolt 244 in permanent assembled relation with the bracket 228.

The stud 188 on the motor 184 has a conical tip 246 thereon, and the lower end of the bolt 244 has a complementary-shaped recess therein. In use, the pin 232 is removed during the period of installation of the pipe hole cutter apparatus 2, and the bracket 228 is swung upwardly, as indicated by phantom lines in FIG. 1. After the apparatus 2 has been installed on the pipe 4, and after the motor 184 has been placed in position, the bracket 228 is closed, and the pin 232 is inserted to hold said bracket in position. The bolt 244 is then tightened into engagement with the stud 188 to apply downward pressure on the cutter assembly 146 to insure that the teeth 152 on the cutter sleeve 150 are in engagement with the side wall of the pipe 4. As cutting progresses, the bolt 244 is progressively turned downwardly by a suitable wrench (indicated by phantom lines at 245 in FIG. 1) to keep the teeth 152 on the cutter sleeve 150 in cutting engagement with the pipe 4.

The cutting teeth 152 of the cutter assembly 146 become heated during the cutting operation and means is provided to supply cooling fluid thereto. For this purpose, the housing 6, FIG. 8, is provided with a fitting 248 in the side wall thereof, to which is attached a pipe nipple 250. A conduit 252 is connected to the nipple 250, and extends to a suitable fluid (water) supply. Thus, cooling water can be supplied during the cutting operation through the fitting 248 to the interior of the housing 6, and hence to the cutting teeth 152. Spent fluid can drain from the housing 6 through the notch openings 12.

In addition to cooling the teeth 152, the flow of water through the housing 6 during the cutting operation serves another important function. As material is removed from the side wall of the pipe 4 by the rotating teeth 152, it will for the most part be washed out of the housing 6 through the openings 12 by the cooling water. Because these cuttings are continually being flushed out of the annular groove G during the cutting process, and because the core 192 is retained by the magnet 214, only a very small amount of material from the wall of the pipe 4 can fall thereinto during the cutting operation. Thus, the possibility of the pipe 4 becoming clogged by removed wall portions is substantially eliminated by the present invention.

Figures 12, 13, 14:
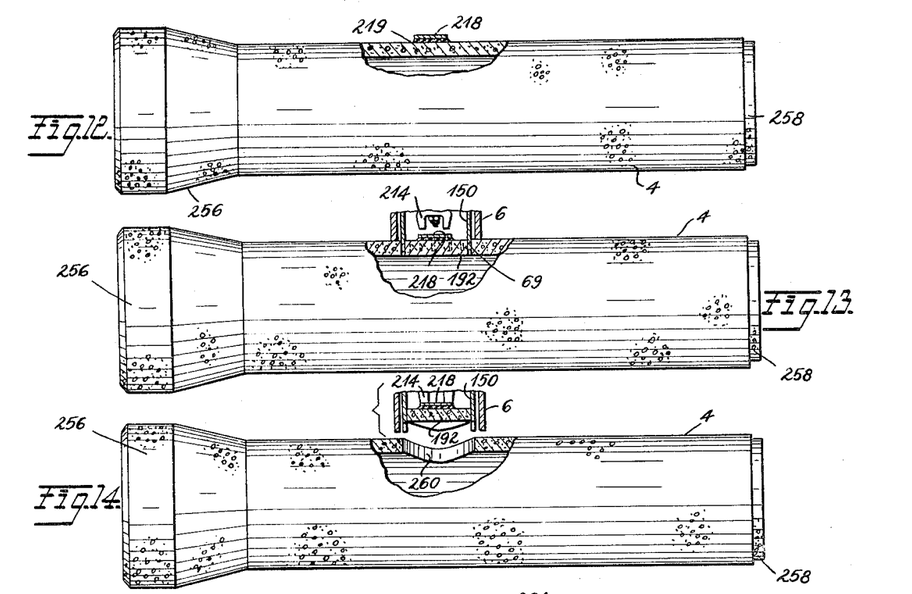
FIGS. 12 through 16, inclusive, illustrate the method of preparing a section of concrete pipe in order to assemble a branch fitting thereto.
Figure 15:
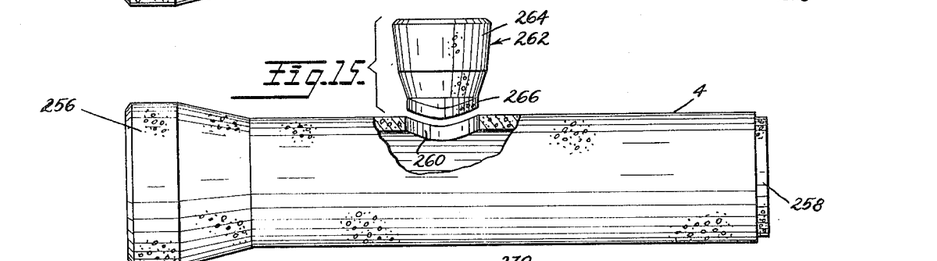
Figure 16:
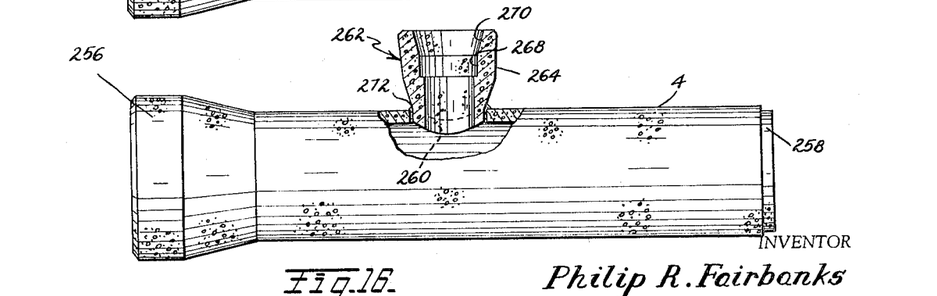

The manner in which the pipe hole cutter 2 is utilized will now be described, with reference to FIGS. 12–16. In said figures, a pipe 4 is shown having a bell end 256 and a spigot end 258. As is shown in FIG. 12, the magnetic-responsive plate 218 is first secured to the surface of the pipe 4 centrally of the proposed opening therein. After the plate 218 is in position, the housing 6 of the apparatus 2 is placed on the pipe 4 over said plate 218, and the arcuate clamping arms 24, 26, 28 and 30 are closed to tightly embrace the outer surface of said pipe.

The cutter assembly 146 is inserted within the housing 6, and the motor 184 is attached thereto. The hold-down bracket 228 is then closed, and the pin 232 is inserted. The motor 184 is thereafter actuated, and water is supplied through the conduit 252 to cool the cutter assembly 146, and to wash away cuttings. FIG. 13 shows the cutter sleeve 150 after it has progressed part of the way through the wall of the pipe 4, the magnet 214 being positioned above the plate 218.

When the cutter sleeve 150 has progressed nearly completely through the side wall of the pipe 4, the magnet 214 will engage with the plate 218, and will retain the core 192 within said cutter sleeve after complete severance of the core from the pipe. The motor 184 is then stopped, the bracket 228 is released, the motor is disconnected from the mandrel 182, and the cutter sleeve 150 is raised clear of the pipe 4. This is illustrated in FIG. 14, wherein the cutter sleeve 150 is shown elevated above the pipe 4, with the core 192 retained therein by the magnet 214 and the plate 218. After the core 192 has been removed from the pipe 4, a smooth hole 260 is exposed within the side wall of the pipe 4.

As described hereinabove, it is common practice to connect a conduit to a sewer line with the use of a stub connector. Such a stub is indicated at 262 in FIG. 15, and includes a body 264 having a cylindrical collar 266 on the lower end thereof. The body 264 has a bore therethrough, and has a cylindrical counterbore 268 in the end thereof, which includes a tapered mouth, or entrance section, 270.

The lower cylindrical collar 266 on the stub 262 is shaped to correspond to the configuration of the side wall of the pipe 4 surrounding the hole 260. The stub 262 is inserted into the hole 260, FIG. 16, and a suitable epoxy resin 272, or other adhesive, is forced into the clearance space between said stub and the wall defining the hole 260. Because the pipe hole cutter apparatus 2 can make a hole having very close dimensional tolerances, it is possible to maintain the space between the wall of the hole 260 and the stub 262 to a very small amount. Typically, the radial distance between the stub 262 and the wall of the hole 260 is about 1/16 of an inch. After the adhesive 272 has dried, the branch connection is completed, and a conduit (not shown) may be connected to the stub 262.

It is thus seen that an apparatus and method has been provided that will cut a dimensionally accurate and smooth hole in the side wall of a concrete pipe. Further, the apparatus of the invention will recover nearly all of the removed portion of the pipe side wall and will thus prevent it from falling into the interior of said pipe. Because of the very close tolerances obtainable from the present invention, a branch fitting may be secured in position by using modern adhesive, rather than the usual grout or mortar mixes. This greatly reduces assembly time, and particularly the open trench time required for making a branch connection when the pipe line is underground, thereby contributing both to safety and to a reduction in overall working time.

The cutter apparatus 2 can be readily adapted to various size pipes merely by utilizing different clamping arms 24, 26, 28 and 30, of a corresponding size. Further, because the cutter sleeve 150 is easily removed from the housing 6, ready interchange of cutter sleeves is facilitated.

Obviously, many modifications and variations of the present invention are possible in the light of the above teachings. It is, therefore, to be understood that, within the scope of the appended claims, the invention may be practiced otherwise than as specifically described.

I claim:
1. Apparatus for cutting a hole in the side wall of a concrete pipe, comprising: a cylindrical housing; a bracket mounted upon said housing at diametrically opposite sides thereof; a pair of clamping arms pivotally connected at one end thereof on each of said brackets for mounting said housing upon said pipe; a roller carried by the other end of each clamping arm and engageable with said pipe; one-way brake means engaging each roller; a lever connected with the pivoted end of each clamping arm; a swivel nut carried by each lever; a turnbuckle rod interconnecting the swivel nuts of the levers associated with each pair of clamping arms, each turnbuckle rod having a right-hand thread at one end thereof and a left-hand thread at the other end thereof and the swivel nuts associated with the threaded ends of each turnbuckle bar having mating right and left-hand threads, whereby rotation of said turnbuckle bars will effect adjustment of said clamping arms toward or away from a pipe when disposed therebetween; a cylindrical cutter sleeve disposed in said housing having teeth at one end thereof engageable with said pipe; said cutter sleeve having two sets of axially spaced and circumferentially staggered openings extending therethrough; rollers carried by said cutter sleeve with one roller extending through each of said openings and engaging said housing to position said cutter sleeve concentrically in said housing; a mandrel connected with said cutter sleeve and extending upwardly therefrom; a motor connected with said mandrel for rotating said cutter sleeve; a bracket connected with said levers in a region above said swivel nuts; adjustable means carried by said bracket and engageable with said motor for urging said motor and cutter sleeve in a direction away from said bracket to engage the teeth of said cutter sleeve with a pipe; a spindle mounted axially within said cutter sleeve; a tubular member mounted on said spindle for axial and rotary movement relative thereto; and a magnet carried by said tubular member.

2. The method of cutting a hole in a concrete pipe, comprising: adhesively bonding a magnetic-responsive plate to the outer surface of said pipe on the area thereof where the hole is to be cut, said plate being of smaller diameter than said hole; cutting an annular groove in said pipe into said outer surface and in surrounding relation to said plate; applying magnetic force to said plate prior to completing the cutting of said annular groove through the pipe; and utilizing said magnetic force to retain the core thus cut from the pipe against falling into said pipe.

3. Apparatus for cutting a circular hole in the side wall of a tubular conduit, comprising: a housing; means for detachably securing said housing to the side wall of said conduit, comprising: at least one pair of confronting, arcuate clamping arms pivotally attached at one end to said housing and positionable about the exterior of said conduit; a lever arm fixed to each of said clamping arms; means interconnecting said lever arms, and operable to simultaneously move said lever arms to pivot said clamping arms toward and away from said conduit; roller means on the free end of each of said clamping arms arranged to engage the exterior of said conduit; and pawl brake means mounted on each clamping arm in engagement with said roller means, and arranged to prevent rotation of said clamping arms and said housing in either direction about the longitudinal axis of said conduit; cutter means, including a cylindrical cutter sleeve mounted within said housing for both rotational and translational movement relative thereto and having axially-directed cutting teeth on one end thereof engageable with said conduit; said cylindrical cutter sleeve being arranged to cut an annular groove completely through the side wall of said conduit to make said circular hole, said annular groove when completed defining a side wall core; means attached to the other end of said cylindrical cutter sleeve operable to rotate it within said housing; and means mounted within said cylindrical cutter sleeve for retaining said side wall core against falling into said conduit.

4. Apparatus for cutting a circular hole in the side wall of a tubular conduit, comprising: a housing having a cylindrical bore extending inwardly from the lower end thereof; means for detachably fixedly securing said housing directly to the side wall of said conduit, with the lower end of said housing engaged with said side wall; and cutter means mounted within said bore for both rotational movement about and translational movement along the longitudinal axis thereof, said cutter means being operable to cut an annular groove completely through said side wall of said conduit to make said circular hole, and comprising: a cylindrical body disposed in said bore and having cutting teeth on the lower end thereof, said body having two sets of axially spaced and circumferentially staggered openings extending through the wall thereof; rollers carried by said cylindrical body with one roller extending through each of said openings and engaging the cylindrical wall of said bore to position said body concentrically in said bore; and a mandrel on the upper end of said cylindrical body for connecting rotating means thereto.

5. Apparatus as recited in claim 4, including means for rotating said cutter means comprising a motor connected with said mandrel on the upper end of said cylindrical body.

6. Apparatus as recited in claim 4, including additionally: means carried by said securing means, and operable to urge said cutter means toward said side wall.

7. Apparatus as recited in claim 4, wherein said securing means comprises: at least one pair of confronting, arcuate clamping arms pivotally connected at one end with said housing, and positionable about the exterior of said conduit; a lever arm fixed to one end of each of said clamping arms; and means connected with said lever arms for simultaneously moving said lever arms to pivot said clamping arms toward and away from said conduit.

8. Apparatus as recited in claim 7, including additionally: roller means on the free ends of said clamping arms arranged to engage the exterior of said conduit and one-way brake means engaging said roller means.

9. Apparatus as recited in claim 4, wherein said cylindrical body is spaced from the cylindrical wall of said bore to provide a flow space therebetween, said housing including a passage in the lower end thereof connecting said flow space with the exterior of said housing; and conduit means connected with the upper end of said flow space to supply liquid thereto for cooling said cutting teeth, and for washing away through said passage conduit side wall material removed by said cutting teeth.

10. Apparatus for cutting a circular hole in the side wall of a tubular conduit, comprising: a housing having a cylindrical bore extending inwardly from the lower end thereof; cutter means mounted within said bore for both rotational movement about and translational movement along the longitudinal axis of said bore, said cutter means being operable to cut an annular groove completely through said side wall of said conduit to make said circular hole; and means for detachably fixedly securing said housing directly to the side wall of said conduit, with the lower end of said housing engaged with said side wall, comprising: a pair of brackets mounted upon said housing at diametrically opposite sides thereof, to extend transversely of said tubular conduit; two pairs of clamping arms, one pair for each bracket, the arms of each pair being pivotally connected at the upper end thereof to the opposite ends of their associated bracket; a roller carried by the lower end of each clamping arm and engageable with said conduit; one-way brake means engaging each roller; a lever connected with the upper end of each clamping arm outwardly of the pivotal connection between said arm and its associated bracket, and extending upwardly therefrom; swivel nut means carried by each lever, and spaced a substantial distance above said brackets; and turnbuckle rod means interconnecting the swivel nut means of each of the levers associated with each pair of clamping arms, and operable to pivot their associated clamping arms toward and away from said conduit.

11. Apparatus for cutting a circular hole in the side wall of a tubular conduit, comprising: a housing having a cylindrical bore extending inwardly from the lower end thereof; means for detachably fixedly securing said housing directly to the side wall of said conduit, with the lower end of said housing engaged with said side wall; cutter means mounted within said bore and guided by the cylindrical wall thereof for both rotational movement concentrically about and translational movement along the longitudinal axis of said bore, said cutter means being operable to cut an annular groove completely through the side wall of said conduit to make said circular hole, said annular groove when completed defining a side wall core; and means for retaining said side wall core against falling into said conduit, comprising: a magnet; means attaching said magnet to said cutter means; and magnetic-responsive material engageable by said magnet and having adhesive means thereon for securing the same to said side wall core.

12. Apparatus as recited in claim 11, wherein said means for attaching said magnet to said cutter includes: a member secured to said magnet; and means mounting said member on said cutter for translational and rotational movement relative thereto.

13. Apparatus for cutting a circular hole in the side wall of a tubular conduit, comprising: a housing having a cylindrical bore extending inwardly from the lower end thereof; means for detachably fixedly securing said housing directly to the side wall of said conduit, with the lower end of said housing engaged with said side wall; cutter means, including a cylindrical cutter sleeve mounted within said bore and guided by the cylindrical wall thereof for both rotational movement concentrically about and translational movement along the longitudinal axis of said bore, and having axially-directed cutting teeth on the lower end thereof engageable with said conduit, said cylindrical cutter sleeve being arranged to cut an annular groove completely through the side wall of said conduit to make said circular hole, said annular groove when completed defining a side wall core; means attached to the upper end of said cylindrical cutter sleeve operable to rotate it within said bore; and means mounted within said cylindrical cutter sleeve for retaining said side wall core against falling into said conduit, said means comprising: a spindle supported concentrically within said cylindrical cutter sleeve; a magnet; means attaching said magnet to said spindle for rotational and translational movement relative to said spindle; and magnetic-responsive material engageable by said magnet and positionable on said core in confronting relation to said magnet.

14. Apparatus for cutting a circular hole in the side wall of a tubular conduit, comprising: a housing having a cylindrical bore extending inwardly from the lower end thereof; means for detachably fixedly securing said housing directly to the side wall of said conduit, with the lower end of said housing engaged with said side wall; cutter means, including a cylindrical cutter sleeve mounted within said bore and guided by the cylindrical wall thereof for both rotational movement concentrically about and translational movement along the longitudinal axis of said bore, and having axially-directed cutting teeth on the lower end thereof engageable with said conduit, said cylindrical cutter sleeve being arranged to cut an annular groove completely through the side wall of said conduit to make said circular hole, said annular groove when completed defining a side wall core; stop means on said cylindrical cutter sleeve to limit the extent of translational movement thereof toward said conduit side wall; means attached to the upper end of said cylindrical cutter sleeve operable to rotate it within said bore; and means mounted within said cylindrical cutter sleeve for retaining said side wall core against falling into said conduit.

15. Apparatus as recited in claim 14, wherein said securing means comprises: at least one pair of confronting, arcuate clamping arms pivotally attached at one end to said housing and positionable about the exterior of said conduit; a lever arm fixed to each of said clamping arms; means interconnecting said lever arms, and operable to simultaneously move said lever arms to pivot said clamping arms toward and away from said conduit; roller means on the free end of each of said clamping arms arranged to engage the exterior of said conduit; and one-way brake means engaging each roller means.

16. Apparatus as recited in claim 15, including additionally: means carried by the free ends of said lever arms and operable to urge said cylindrical cutter sleeve axially into engagement with said conduit side wall.

References Cited by the Examiner

UNITED STATES PATENTS

| | | | |
|---|---|---|---|
| 515,976 | 3/1894 | Smith | 77—38 |
| 563,488 | 7/1896 | Howe | 77—42 |
| 1,045,289 | 11/1912 | Hill | 77—42 |
| 1,385,732 | 7/1921 | Taylor | 90—59.9 |
| 2,024,390 | 12/1935 | Roesch | 77—14 |
| 2,881,643 | 4/1959 | Haade | 77—42 |
| 2,911,859 | 11/1959 | Longley et al. | 77—42 |
| 2,932,193 | 4/1960 | Van Scoy | 77—42 |
| 2,941,427 | 6/1960 | Ver Nooy | 77—42 |
| 3,090,260 | 5/1963 | Brooks et al. | 77—37 X |

FOREIGN PATENTS

| | | |
|---|---|---|
| 887,594 | 8/1953 | Germany. |
| 588 | 1883 | Great Britain. |

FRANCIS S. HUSAR, *Primary Examiner.*